US008116566B2

(12) United States Patent
Kirby et al.

(10) Patent No.: US 8,116,566 B2
(45) Date of Patent: Feb. 14, 2012

(54) UNKNOWN PATTERN SET RECOGNITION

(75) Inventors: Michael Joseph Kirby, Fort Collins, CO (US); James Ross Beveridge, Fort Collins, CO (US); Jen-Mei Chang, Fort Collins, CO (US); Bruce Anthony Draper, Fort Collins, CO (US); Holger Philipp Kley, Fort Collins, CO (US); Christopher Scott Peterson, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 1180 days.

(21) Appl. No.: 11/846,486

(22) Filed: Aug. 28, 2007

(65) Prior Publication Data
US 2008/0175446 A1 Jul. 24, 2008

Related U.S. Application Data

(60) Provisional application No. 60/840,563, filed on Aug. 28, 2006.

(51) Int. Cl.
*G06K 9/00* (2006.01)
(52) U.S. Cl. ........................................ 382/181; 382/118
(58) Field of Classification Search ................... 382/181
See application file for complete search history.

(56) References Cited

U.S. PATENT DOCUMENTS

| 4,752,957 | A |   | 6/1988  | Maeda         |        |
|-----------|---|---|---------|---------------|--------|
| 5,223,207 | A |   | 6/1993  | Gross et al.  |        |
| 5,586,066 | A |   | 12/1996 | White et al.  |        |
| 5,629,872 | A |   | 5/1997  | Gross et al.  |        |
| 5,745,382 | A |   | 4/1998  | Vilim et al.  |        |
| 5,761,090 | A |   | 6/1998  | Gross et al.  |        |
| 5,764,509 | A |   | 6/1998  | Gross et al.  |        |
| 5,842,194 | A | * | 11/1998 | Arbuckle      | 706/52 |
| 6,119,111 | A |   | 9/2000  | Gross et al.  |        |
| 6,131,076 | A |   | 10/2000 | Stephan et al.|        |
| 6,466,685 | B1|   | 10/2002 | Fukui et al.  |        |
| 6,493,465 | B2|   | 12/2002 | Mori et al.   |        |
| 6,907,141 | B1| * | 6/2005  | Okamoto       | 382/225|
| 6,928,233 | B1| * | 8/2005  | Walker et al. | 386/241|
| 6,996,257 | B2|   | 2/2006  | Wang          |        |
| 7,224,835 | B2|   | 5/2007  | Maeda et al.  |        |

(Continued)

OTHER PUBLICATIONS

Vasconcelos, N. and Lippman, A., "A multiresolution manifold distance for invariant image similarity," IEEE Transactions on Multimedia, 2005, 17pages, University of California, posted at eScholarship Repository, <http://repositories.cdlib.org/postprints/692.

(Continued)

*Primary Examiner* — David Zarka
(74) *Attorney, Agent, or Firm* — HolzerIPLaw. PC

(57) ABSTRACT

A pattern recognition system compares a set of unlabeled images (or other patterns) having a variation of state in a set-by-set comparison with individual data sets of multiple labeled images (or other patterns) also having a variation of state. The individual data sets are each mapped to a point on a parameter space (e.g., a Grassmannian manifold, a Stiefel manifold, a flag manifold, etc.), and the set of unlabeled images is mapped to a point in the same parameter space. If the point associated with the set of unlabeled images satisfies a distance criterion on the parameter space with regard to one of the points on the parameter space, the data set of unlabeled images is assigned to the class attributed to that point.

20 Claims, 4 Drawing Sheets

U.S. PATENT DOCUMENTS

| | | | |
|---|---|---|---|
| 2002/0039446 A1* | 4/2002 | Santoni | 382/209 |
| 2002/0080347 A1* | 6/2002 | Yoda et al. | 356/237.2 |
| 2005/0147291 A1 | 7/2005 | Huang et al. | |
| 2005/0232495 A1* | 10/2005 | Katoh et al. | 382/225 |
| 2006/0034500 A1* | 2/2006 | Quist et al. | 382/130 |

OTHER PUBLICATIONS

Arandjelović, O. and Cipolla, R., "An information-theoretic approach to face recognition from face motion manifolds," University of Cambridge, accepted Aug. 23, 2005, 9 pages, Copyright 2005, Elsevier B.V.

Gross, R., Matthews, I., and Baker, S., "Appearance-Based Face Recognition and Light-Fields," IEEE Transactions on Pattern Analysis and Machine Intelligence, vol. 26, No. 4, Apr. 2004, published by IEEE Computer Society.

Fraser, A., Hengartner, N., Vixie, K., and Wohlberg, B., "Classification Modulo Invariance, with Application to Face Recognition," 19 pages, Los Alamos National Laboratory.

Gross, R., Matthews, I., and Baker, S., "Eigen Light-Fields and Face Recognition Across Pose," The Robotics Institute, Carnegie Mellon University, Pittsburgh, PA, 7 pages, appeared in 2002 International Conference on Automatic Face and Gesture Recognition.

Romdhani, S., Blanz, V., and Vetter, T., "Face Identification by Fitting a 3D Morphable Model using Linear Shape and Texture Error Functions," University of Freiburg, Freiburg, German, appeared in European Conference on Computer Vision, 2002, Springer-Verlag, Germany.

Quan-Sen Sun, Pheng-Ann Heng, Zhong Jin, and De-Shen Xia, "Face Recognition Based on Generalized Canonical Correlation Analysis," International Conference on Intelligent Computing 2005, Part II, Lecture Notes in Computer Sciences 3645, pp. 958-967, Copyright 2005 Springer-Verlag, Germany.

Shakhnarovich, G., Fisher, J.W., and Darrell, T., "Face recognition from long-term observations," Artificial Intelligence Laboratory, Massachusetts Institute of Technology, white paper, 15 pages.

Arandjelović, O., and Cipolla, R., "Face Recognition from Video using the Generic Shape-Illumination Manifold," Department of Engineering, University of Cambridge, Cambridge, UK, white paper, 15 pages.

Fukui, K., and Yamaguchi, O., "Face Recognition Using Multi-viewpoint Patterns for Robot Vision," Corporate Research and Development Center, Toshiba Corporation, Kawasaki, Japan, presented at 11th International Symposium of Robotics Research (ISRR) 2003, pp. 192-201.

Yamaguchi, O., Fukui, K., and Maeda, K, "Face Recognition Using Temporal Image Sequence," Kansai Research Laboratories, Toshiba Corporation, Kobe, Japan, white paper, 6 pages.

Arandjelović, O., Shakhnarovich, G., Fisher, J., Cipolla, R., and Darrell, T., "Face Recognition with Image Sets Using Manifold Density Divergence," presented at Proceedings of the 2005 IEEE Computer Society Conference on Computer Vision and Pattern Recognition, Copyright 2005, Institute of Electrical and Electronics Engineers, Inc., 8 pages.

Nishiyama, M., Yamaguchi, O., and Fukui, K., "Face Recognition with the Multiple Constrained Mutual Subspace Method," Audio- and Video-Based Biometric Person Authentication (AVBPA), 5th International Conference, Lecture Notes in Computer Science 3546, pp. 71-80, AVBPA 2005, Rye Brook, New York.

Gross, R., Matthews, I., and Baker, S., "Fisher Light-Fields for Face Recognition Across Pose and Illumination," The Robotics Institute, Carnegie Mellon University, Pittsburgh, PA, 8 pages.

Georghiades, A.S., Belhumeur, P.N., and Kriegman, D.J., "From Few to Many: Generative Models for Recognition Under Variable Pose and Illumination," Departments of Electrical Engineering and Computer Science, Yale University, New Haven, Connecticut, and Beckman Institute, University of Illinois, Urbana, Illinois, 8 pages.

Edelman, A., Arias, T.A., and Smith, S.T., "The Geometry of Algorithms With Orthogonality Constraints," Siam J. Matrix Anal. Appl., vol. 20, No. 2, pp. 303-353, Copyright 1998 Society for Industrial and Applied Mathematics.

Chang, Jen-Mei, Beveridge, J.R., Draper, B.A., Kirby, M., Kley, H., and Peterson, C., "Illumination Face Spaces are Idiosyncratic," white paper, Colorado State University, Departments of Computer Science and Mathematics, Ft. Collins, Colorado, 7 pages.

Zhou, S.K. and Chellappa, R., "Image-based face recognition under illumination and pose variations," Journal of the Optical Society of America A, vol. 22, No. 2, Feb. 2005, pp. 217-229, Copyright 2005 Optical Society of America.

Fitzgibbon, A.W. And Zisserman, A., "Joint Manifold Distance: a new approach to appearance based clustering," white paper, University of Oxford, U.K., Copyright 2003 Institute of Electrical and Electronics Engineers, Inc., 8 pages.

Basri, R., and Jacobs, D.W., "Lambertian Reflectance and Linear Subspaces," IEEE Transactions on Pattern Analysis and Machine Intelligence, vol. 25, No. 2, Feb. 2003, pp. 218-233, published by IEEE Computer Society.

Tae-Kyun Kim, Kittler, J., and Cipolla, R., "Learning Discriminative Canonical Correlations for Object Recognition with Image Sets," white paper, pp. 1-12, Dept. of Engineering, University of Cambridge, Cambridge, UK, Centre for Vision, Speech and Signal Processing, University of Surrey, Guildford, UK.

Tae-Kyun Kim, Arandjelović, O., and Cipolla, R., "Learning over Sets using Boosted Manifold Principal Angles (BoMPA)," Department of Engineering, University of Cambridge, Cambridge, UK, white paper, 10 pages.

Wolf, L., and Shashua, A., "Learning over Sets using Kernel Principal Angles," Journal of Machine Learning Research 4, published Oct. 2003, pp. 913-931, Copyright Lior Wolf and Amnon Shashua.

Jen-Mei Chang, Kirby, M., Kley, H., Peterson, C., Draper, B., and Beveridge, J.R., "Recognition of Digital Images of the Human Face at Ultra Low Resolution via Illumination Spaces," white paper, Dept. of Mathematics, Colorado State University, Ft. Collins, Colorado, 11 pages.

Vasconcelos, N. and Lippman, A., "Multiresolution Tangent Distance for Affine-invariant Classification," white paper, 7 pages, MIT Media Laboratory, Cambridge, Massachusetts.

Liu, Xiuwen, Srivastava, A., and Gallivan, K., "Optimal Linear Representations of Images for Object Recognition," presented at the Proceedings of the 2003 IEEE Computer Society Conference on Computer Vision and Pattern Recognition (CVPR), 6 pages, Copyright 2003, Institute of Electrical and Electronics Engineers, Inc.

Conway, J.H., Hardin, R.H., and Sloane, N.J.A., "Packing Lines, Planes, etc.: Packings in Grassmannian Spaces,"0 Experimental Mathematics, vol. 5, No. 2, 1996, pp. 139-159, Copyright A.K. Peters, Ltd., Wellesley, Massachusetts.

Dahua Lin, Shuicheng Yan, and Xiaoou Tang, "Pursuing Informative Projection on Grassmann Manifold," presented at the Proceedings of the 2006 IEEE Computer Society Conference on Computer Vision and Pattern Recognition (CVPR), 8 pages, Copyright 2006, Institute of Electrical and Electronics Engineers, Inc.

Nishiyama, M., Yuasa, M., Shibata, T., Wakasugi, T., Kawahara, T., and Yamaguchi, O., "Recognizing Faces of Moving People by Hierarchical Image-Set Matching," Corporate Research & Development, Toshiba Corporation, Japan, 8 pages, Copyright 2007, Institute of Electrical and Electronics Engineers, Inc.

Chang, Jen-Mei, Kirby, M., and Peterson, C., "Set-to-Set Face Recognition Under Variations in Pose and Illumination," presented at the 2007 Biometrics Symposium, Baltimore, MD, Sep. 2007, Copyright 2007, Institute of Electrical and Electronics Engineers, Inc.

Simard, P.Y., Le Cun, Y.A., Denker, J.S., and Victorri, B., "Transformation Invariance in Pattern Recognition—Tangent Distance and Tangent Propagation," Image Processing Services Research Lab, AT&T Labs, Red Bank, New Jersey and University of Caen, France, white paper, 35 pages.

Belhumeur, P.N., Kriegman, D.J., "What Is the Set of Images of an Object under All Possible Illumination Conditions?" International Journal of Computer Vision, vol. 28, Issue No. 3, pp. 1-16, Copyright 1998 Kluwer Academic Publishers, Boston, Massachusetts.

Non-Final Office Action dated May 13, 2010, U.S. Appl. No. 12/036,117, 8 pages.

* cited by examiner

UNKNOWN PATTERN SET RECOGNITION

CROSS-REFERENCE TO RELATED APPLICATIONS

The present application claims benefit of U.S. Provisional Application No. 60/840,563, entitled "Object Recognition: Grassmannian Camera and Illumination Modeling Method" and filed on Aug. 28, 2006, which is specifically incorporated by reference herein for all that it discloses and teaches.

STATEMENT REGARDING FEDERALLY SPONSORED RESEARCH OR DEVELOPMENT

This technology was developed with sponsorship by the National Science Foundation Contract No. DMS-0434351, and the Air Force Office of Scientific Research Contract No. FA9550-04-1-0094 P00002, and the government has certain rights to this technology.

BACKGROUND

Face recognition technology is a type of pattern recognition used to identify an individual based on video or still frame images of the individual's face. Typically, a data set of images of the individual's face (i.e., a specific type of pattern) is first collected and then a face image of an unknown individual is evaluated relative to this data set. Traditional face recognition has focused on individual comparisons between single images. As such, if the unknown face image sufficiently matches one or more of the data sets of the known individual, the unknown face image may be classified as that of the individual.

Typically, however, the initial data set of images tends to include substantial variations of state, e.g., in illumination, that make the evaluation with the unknown face image difficult to resolve. In one existing approach, illumination variations in the data set are removed by computing illumination invariant images to obtain a more normalized data set. Likewise, an illumination invariant version of the unknown image is also computed. Unfortunately, such normalization discards or obfuscates unique characteristics of each image.

SUMMARY

Implementations described and claimed herein address the foregoing problems, among others, by recognizing that variations in the states of patterns can be exploited for their discriminatory information and should not be discarded as noise. A pattern recognition system compares a data set of unlabeled patterns having a variation of state in a set-by-set comparison with individual data sets of multiple labeled patterns also having a variation of state. The individual data sets are each mapped to a point on a parameter space, and the data set of unlabeled patterns is mapped to a point in the same parameter space. If the point associated with the data set of unlabeled patterns satisfies a distance-based similarity criterion on the parameter space with regard to one of the points on the parameter space, the data set of unlabeled patterns is assigned to the class attributed to that point.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. It should also be understood that, although specific implementations are described herein, the described technology may be applied to other systems.

BRIEF DESCRIPTIONS OF THE DRAWINGS

DETAILED DESCRIPTIONS

Figure 1:
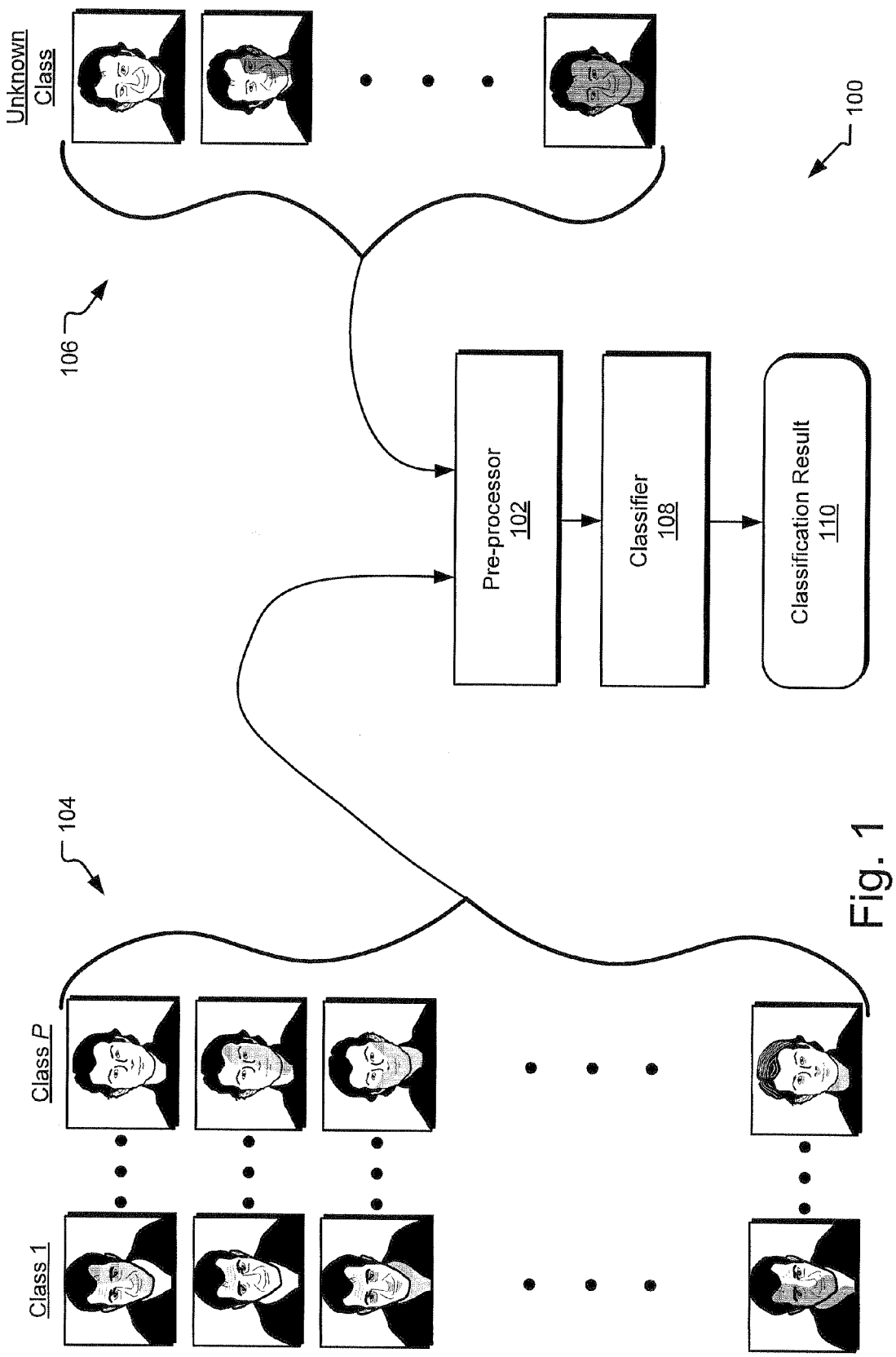
FIG. 1 illustrates an example system for performing set-to-set pattern recognition.

The described technology takes advantage of variations in one or more states of a pattern drawn from a family of patterns. These variations can be exploited to improve association of unidentified sets of patterns to labeled sets. As such, collected data with variations of state (e.g., via an illumination camera that records an image over variations in illumination or another pattern capture device that records patterns having alternative variations of state) can be employed to improve pattern recognition accuracy.

Generally, set-to-set pattern recognition is performed in at least one implementation by encoding a data set of patterns abstractly as a point on a parameter space where there exists a family of metrics (which may include pseudo-metrics and other similarity measure), each of which imposes a different geometry. The term "distance" may also be used to refer to a "similarity measure". In one implementation, a metric or pseudo-metric on the parameter space can be used for comparing distances between these points. From another perspective, such a metric may measure how close points are to each other on a parameter space. The term "point" is general and results from the encoding of a data set (e.g., images or other patterns) as a point on a Grassmann manifold, a Stiefel manifold, a flag manifold, or other parameter space.

In one implementation, a data set of patterns is processed to define a subspace represented as a point on a Grassmannian. In another implementation, the data set of patterns is processed to define an ordered set of orthonormal vectors as a point on a Stiefel manifold. Other mappings are also contemplated, such as to a point on a flag manifold or a product of manifolds. By this application, the data set of patterns is mapped to a point on the parameter space. For example, each data set of images in a collection of images sets may be mapped to the set of points $p_1, p_2, \ldots p_p$. The distance-based similarity between any two points may be written as $$d = d_{\theta,w}(p_i, p_j)$$

where $\theta$ is a vector of principal angles and $w$ consists of weighting parameters that can be used to further refine the distance-based similarity metric. One example of a distance between two points on a parameter space may be given by the weighted metric $$d_{\theta,w}(p_i, p_j) = \left( \sum_{i=1}^{q} w_i \theta_i^2 \right)^{\frac{1}{2}} = \|\theta\|_2^w.$$

In one implementation, the parameters $w_i$ may be selected a priori based on problem dependent considerations. For example, one may take the weight associated with larger principal angle to be smaller than those weights associated with smaller principal angles (e.g., the more noise in the system, the more one would choose deemphasize the larger principal angles). In an alternative implementation, the parameters $w_i$ may be adapted or trained to improve the classification of the labeled images. For example, as more data sets are received, labeled data sets may be re-classified and compared to the known, correct labels. Based on these comparisons, the parameters $w_i$ may be adjusted so as to yield more accurate classification results.

Using the parameters $w_i$, points that have distinct labels in one parameter space may be separated (i.e., given a greater distance on the parameter space) while preserving neighbor relationships with the same label by using iterative descent methods on cost functions. Alternatively, the parameters $w_i$ may be set to change an unweighted distance in a spherical parameter space to a greater distance in a weighted parameter space (e.g., a parameter space resembling a prolate spheroid).

FIG. 1 illustrates an example system 100 for performing set-to-set pattern recognition. A pre-processor 102 receives a collection 104 of individual raw data sets of multiple labeled images. Each data set represents multiple observations of a member of the class, possibly in multiple modalities (e.g., audio and video data). Each observation in a data set has a shared characteristic, such as being associated with the same individual, the same object, etc. In one implementation, for example, each data set includes multiple images having a variation of state distinguishing each image in the data set from each other image in the data set. For example, in the data set marked in FIG. 1 as "Class 1," each image depicts the same individual under different variations of state (e.g., a combination of pose and illumination). Likewise, in the data set marked in FIG. 1 as "Class P," each image depicts another individual under different variations of state. Variations of multiple states simultaneously, such as pose and illumination varying together, provides significant additional information that can be employed in a fashion similar to the variation of a single state for enhanced classification.

In an alternative implementation, the shared characteristic is not limited to an "identity" of the subject but instead can be a shared characteristic among multiple distinct objects. For example, the observations may be images of different tissue samples having the same pathology (e.g., all of the tissue samples in a data set have a particular type of cancerous cells), all of the military tank images in a data set are of the same model type, all of the satellite photos of a geographical region are cultivated, etc. As such, each data set may include observations representing families of patterns, where all patterns in a family share at least one characteristic.

Accordingly, FIG. 1 shows a collection 104 of data sets, wherein each data set represents a pattern originating from P-classes (e.g., individual identities), or families of patterns. Each pattern is designated as $C_i$, where i=1, . . . , P. Variations of state may include without limitation physical conditions (e.g., temperature, pressure), positional conditions (e.g., distance, scale, translation, rotation), illumination (e.g., angle, intensity, frequency, wavelengths distributions) and other characteristics. It should also be understood that other variations of state may apply, particularly for patterns other than images (e.g., electroencephalography or "EEG" results, electrocardiogram or "EKG" results, audio signatures, etc.). A combination of values representing one or more select conditions of each observation (e.g., each image) defines the variation of state of that observation.

In addition, the pre-processor 102 also receives a data set 106 of multiple related but unlabeled images. The data set 106 represents multiple observations of a member of an unknown class. In one implementation, for example, each data set includes multiple images having a variation of state distinguishing each image in the data set from each other image in the data set.

The pre-processor 102 estimates a point representing the illumination variations for a given data set of patterns. An example mechanism for estimating an illumination point (or any applicable point informed by variations in state) for a given individual person is described herein. However, it should be understood that such a mechanism or other similar mechanisms may be applied to other patterns (e.g., EEG results, EKG results, sonar signals, radar signals, microscopic patterns, satellite images, infrared images, ultraviolet images, etc.). In the case of faces, for example, each face image may be geometrically normalized based upon known eye positions. In addition, the background area outside the face itself (or some other predetermined sub-region) may be zeroed, erased, or ignored. However, a benefit of the described technology is that such normalization may be omitted or reduced in such as way as to take advantage of these variations.

In one implementation, a point on a parameter space is generated by first mapping the set of images to a set of ordered orthonormal basis vectors (Stiefel manifold) or a subspace of a fixed vector space (Grassmann manifold). In another implementation, a point may be viewed as the concatenation of points arising from nested parameterizations of different dimensions. The set of orthonormal vectors may be found via a range of algorithms including but not limited to the singular value decomposition (SVD), the generalized singular value decomposition, signal fraction analysis, principal vectors, independent component analysis and canonical correlation analysis.

As a generalization of such approaches, a set of data may be mapped to a point as a nested sequence of subspaces of fixed dimensions on a flag manifold. The construction of a point on a parameter space may use the data in its original acquisition space or in an altered form. In one implementation, whether a point is mapped (e.g., encoded) on a Grassmann, Stiefel, or flag manifold, or even a more general parameter space, is dependent upon the nature of the information comprising the data set. The Grassmann representation is coarser than the Stiefel representation because two points are identified if they are related by a rotational matrix (i.e., there is a surjective map from the Stiefel manifold to the Grassmann manifold by identifying an ordered k-tuple of orthonormal vectors to their span). The flag manifold point representation reveals information about the pattern set across a hierarchy of nested subspaces. Additionally, points on the flag manifold can have additional information attached to them by extending the flag manifold as a product manifold, which captures desirable weightings of the subspaces.

For example, each image may unrolled into a vector $x_i^{(j)}$, which is the $j^{th}$ observation or image of the subject i. A data matrix $X_i$ for subject i is then denoted by $X_i=[x_i^{(1)}| \ldots |x_i^{(k)}]$, where there are k observations of the subject i. This raw data matrix can, without data compression, be used to generate an ordered orthonormal basis, or sequence of nested bases, to map the data set to a point on a parameter space.

In some implementations, the data matrix may be initially reduced to yield the desired point representation. For example, a subspace representation for the $i^{th}$ subject may be constructed from the k images of its data matrix $X_i$ via SVD. The q basis vectors for the $i^{th}$ subject's q-dimensional subspace are the strongest q-left singular vectors in the SVD of $X_i$. In other words, the q-dimensional subspace of $X_i$ is given by the column space $R(X_i)$ of its first q left singular vectors.

An orthogonal projection that is the transpose of the matrix of the left singular vectors obtained via SVD of $X_i$ is applied to $X_i$ to serve as a first-step dimensionality reduction. This computation does not change the geometry of the parameter space since a unitary transformation is merely a rotation on the parameter space.

In some applications, one or more datasets may be augmented by including mirror images or additional images altered by some other transformation. For facial images, the symmetrization of the data set imposes even and odd symmetry on the basis functions analogous to sinusoidal expansions. For sets of facial images under varying illumination conditions, reflection augmentation dramatically improves the estimated linear representation by both increasing the effective sample set and introducing novel illumination conditions. As a consequence, the estimation of points that capture variations in illumination for each class can be improved without acquiring additional data.

In addition to computing points on parameter spaces that capture the variation in illumination, the pre-processor 102 can also constrain the computation of points by restricting the raw data to one or more "patches" of the observation, to projections to fiducial points within the image, or even to an arbitrary selection of image points (e.g., random projections) within each image. In such implementations, the patches or data points used are consistent from observation to observation and data set to data set. (A patch may be considered a strictly or loosely connected set of points within the base image or pattern.)

A set of observations may also contain multiple modalities and within each modality a disparate number of points. For example, a set may consist of images each of which has a different number of pixels. The pre-processor 102 may normalize these images by interpolating values to make render each image the size of the highest resolution image.

Grassmann manifolds, as well as Stiefel manifolds and flag manifolds, allow for families of matrices that fit into the described framework, although other parameter spaces may be employed. A distinction between the Grassman manifold and the Stiefel manifold is that the Grassmann manifold Gr(k, n) views every k-dimensional subspace of $R^n$ (respectively $C^n$) as a point while a Stiefel manifold S(k, n) views every ordered k-tuple of orthonormal vectors in $R^n$ (respectively $C^n$) as a point. The Stiefel manifolds are not rotationally invariant and afford discriminatory information when there is information in a subspace that is related to the ordering of the basis vectors. For example, different frequencies of illumination generate different bases. As such, if one does not want the subspace representation to be rotationally invariant, mapping the data sets to a Stiefel manifold may be preferred. In this choice, different orderings of the basis correspond to fundamentally different objects. In alternative implementations, flag manifolds are generalizations of a hierarchical subspace representation that creates a more refined structure for pattern recognition. Products of manifolds allow for even further refinement of the information that can be captured in a parameter space.

In summary, the pre-processor 102 estimates a point on a parameter space representing variations in illumination for each class of facial images. This concept extends to other patterns and variations of state as well—for each pattern in a given family, a pre-processor estimates a point (e.g., a subspace, a sequence of nested subspaces or an ordered orthonormal basis, all representing a data set of patterns) in a geometric parameter space. Furthermore, it should be understood that the data from which each point is estimated may be constrained consistently across the patterns and data sets. For example, the estimation may be performed using only a region of each facial image corresponding to the right eye in each image. Alternatively, a pattern of arbitrarily-selected pixels may be extracted consistently from each image and the point estimate may be developed from the values of those arbitrarily-selected pixels. In this fashion, a point representing the $X_i$ of each data set is generated.

A classifier 108 receives the computed points representing variations in illumination for both the data sets in the collection 104 and the data set 106 and applies the points to a similarity criterion. In this manner, each data set is mapped a point on a parameter space, such as a Grassmann manifold, although other parameter spaces may be employed.

Figure 2:
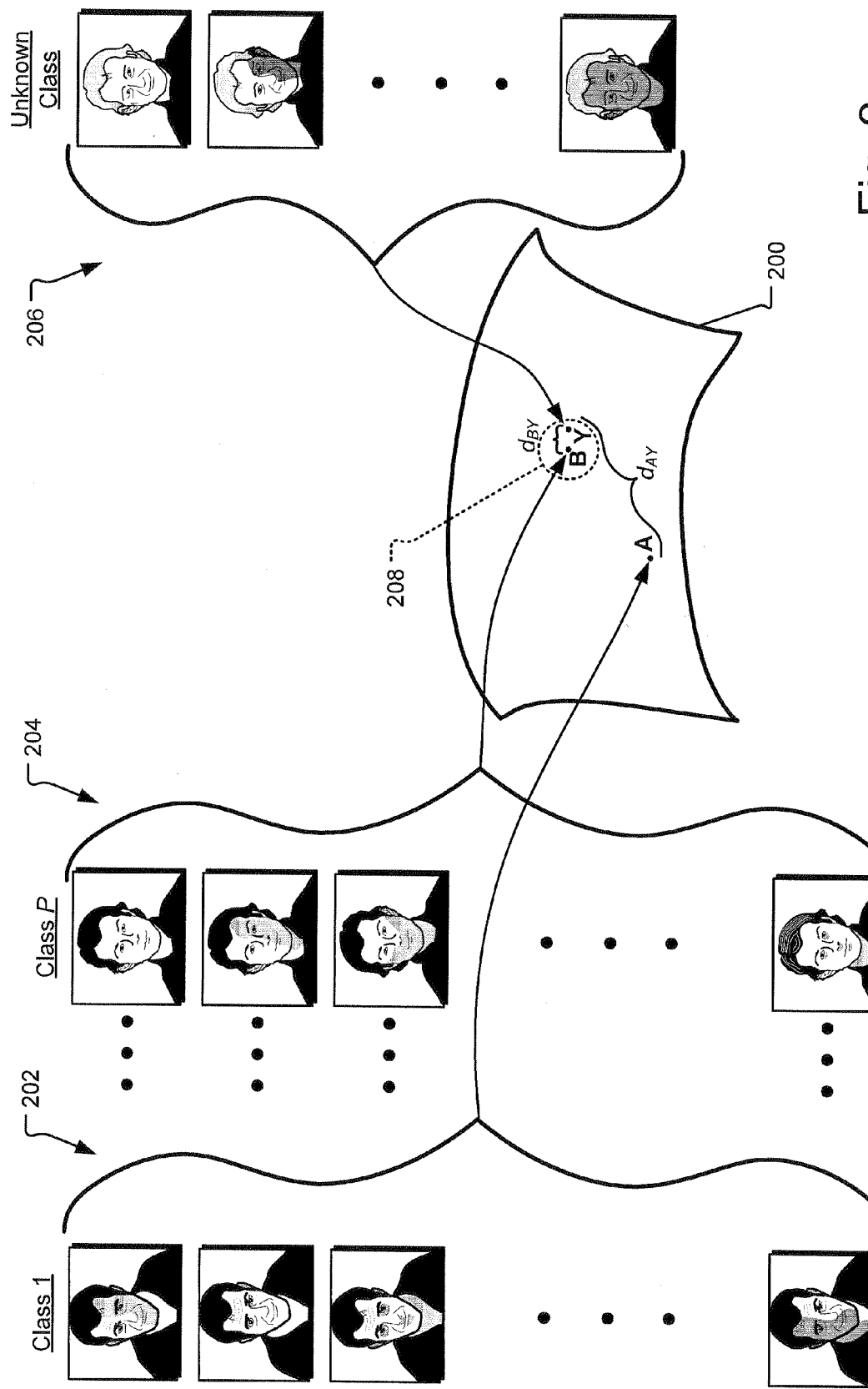
FIG. 2 illustrates an example framework for performing set-to-set pattern recognition on a parameter space.

Turning momentarily to FIG. 2, an example framework for performing set-to-set pattern recognition is shown on a parameter space 200 is shown. The data set 202 is vectorized and mapped to a point A on the parameter space 200 (e.g., the Grassmannian). The data set 204 is vectorized and mapped to a point B on the parameter space 200. It should be understood that many other data sets (e.g., up to P) are also vectorized and mapped to a point (not shown) on the parameter space 200. Upon receipt of the data set 206, it too is vectorized and mapped to a point Y on the parameter space 200. It should be understood that the points can reside on one or more parameter spaces, such as in the case of nested subspaces.

In one implementation, an algorithm for calculating principal angles between linear subspaces with SVD provides a basis for computing distances between points on a parameter space. If X and Y represent two vector subspace points within $R^m$, such that $$p=\dim(X) \geq \dim(Y)=q \geq 1,$$

then the principal angles $$\theta_k \in \left[0, \frac{\pi}{2}\right], 1 \leq k \leq q$$

between X and Y are defined recursively by $$\cos(\theta_k) = \max_{\substack{u \in X \\ \|u\|_2=1}} \max_{\substack{v \in Y \\ \|v\|_2=1}} u^T v, k = 1, \ldots, q.$$

Accordingly, the principal angles satisfy $$0 \leq \theta_1 \leq \theta_2 \leq \ldots \leq \theta_q \leq \frac{\pi}{2}.$$

As such, as described herein, $\theta=(\theta_1, \ldots, \theta_q)$ denotes the principal angle vector. Furthermore, the similarity measure (e.g., the distance on a parameter space between two points X and Y using principal angles) is represented by $$d_{ss}(X,Y) = \max\{|\sin \theta_i|\} = |\sin \theta_q| = \|\sin \theta\|_\infty.$$

Having established a stable framework for computing distances on an arbitrary parameter space, it is left to develop a distance representation in a specific parameter space. A (real) Grassmann manifold or Grassmannian (of q-planes in m-space) is the set G(q,m) of q-dimensional vector subspaces of $R^m$ (for fixed $q \leq m$). The (differential) topology on G(q,m) can be described in several ways. For example, as a quotient (homogeneous space) of the orthogonal group, $$G(q, m) = \frac{O(m)}{O(q)O(m-q)}.$$

This invariant Riemannian metric on orthogonal matrices O(m) descends to a Riemannian metric on the homogeneous space G(q,m). The resulting geodesic distance function on the Grassmannian is termed the "arc length" or "geodesic distance", represented as $d_g$. In terms of principle angles $\theta_1, \ldots, \theta_q$ between two illumination spaces X and Y in the Grassmannian parameter space, the geodesic distance is given by $$d_g(X, Y) = \left(\sum_{i=1}^{q} \theta_i^2\right)^{\frac{1}{2}} = \|\theta\|_2.$$

In an alternative approach, G(q,m) can be defined as a submanifold of projective space via the Plücker embedding, $$G(q, m) \subset P(\wedge^q R^m) = P^{\binom{m}{q}-1}(R).$$

In this approach, the Grassmannian inherits a Riemannian metric from the Fubini-Study metric on projective space and the resulting Fubini-Study distance $d_{FS}$ is given in terms of the principal angles by $$d_{FS}(X, Y) = \cos^{-1}\left(\prod_{i=1}^{q} \cos\theta_i\right)$$

In yet another alternative approach, G(q,m) can be defined as a submanifold of Euclidean space via a projection embedding, $$G(q, m) \subset R^{\frac{(m^2+m-2)}{2}}.$$

In this approach, the usual Euclidean distance function is restricted on $$R^{\frac{(m^2+m-2)}{2}}$$

to the Grassmannian to obtain the projection F or chordal distance $d_c$, so called because the image of the Grassmannian lies in a sphere. Thus, the restricted distance is the distance along a straight-line chord connecting one point of that sphere to another. In terms of principle angles, $$d_c(X, Y) = \left(\sum_{i=1}^{q} (\sin\theta_i)^2\right)^{\frac{1}{2}} = \|\sin\theta\|_2.$$

A variation of the Euclidean distance approach considers the so-called chordal Frobenius distance $d_{cF}$, given in terms of the principal angles by $$d_{cF}(X, Y) = \left(\sum_{i=1}^{q} 4\left(\sin\frac{1}{2}\theta_i\right)^2\right)^{\frac{1}{2}} = \left\|2\sin\frac{1}{2}\theta\right\|_2.$$

If $1 \leq l \leq q$ for subspaces X,Y∈G(q,m), the truncated or l-truncated principal angle vector is defined as $\theta^l := (\theta_1, \ldots, \theta_l)$ where $\theta_1 \leq \ldots \leq \theta_q$ are the principal angles between X and Y. From this assumption, the l-truncated arc length distance $d_g^l$, Fubini-Study distance $d_{FS}^l$, projection F or chordal distance $d_c^l$, and chordal Frobenius distance $d_{cF}^l$ may be obtained:

$$d_g^l(X, Y) := \|\theta^l\|_2,$$

$$d_{FS}^l(X, Y) := \cos^{-1}\prod_{i=1}^{l} \cos\theta_i,$$

$$d_c^l(X, Y) := \|\sin\theta^l\|_2, \text{ and}$$

$$d_{cF}^l(X, Y) := \left\|2\sin\frac{1}{2}\theta^l\right\|_2.$$

If $q > \dim(X \cap Y) \leq l$, then all of the l-truncated distances between X and Y are zero, even though X≠Y. However, dim(X∩Y)=0 whenever X and Y are distinct, so the l-truncated distances represent true distances on the discrete set of tested experimental data. In addition, the truncations tend to decrease the sensitivity of the classification system to noise. Nevertheless, it should be understood that while four example approaches for defining a similarity measure between points of the Grassmannian G(q,m) have been described, other approaches may alternatively be used.

It should be understood that these principal angle metrics are special cases of the more general distance metrics d(X, Y)= f($\theta_1, \ldots, \theta_q$), where f(·) is selected such that that d(X,Y) provides useful classification of the unknown data sets.

Returning to the description of FIG. 1, the classifier 108 uses a similarity criterion (e.g., a distance criterion) to classify the data set 106 based on the collection 104. One perspective of the distance criterion is that an illumination subspace estimated from images of one subject should be closer to another illumination subspace estimated from the same subject than to an illumination space estimated from a different subject. In one implementation, the distance criterion is informed by another perspective: an illumination space estimated from images of one subject may represent a new or previously unknown class if the distance between the illumination subspace and any other illumination subspace of the collection 104 does not fall below a defined threshold.

The classifier 108 determines the distances $d_{ss}(X_i, Y)$ for all i, where i=1, . . . , P, $X_i$ represents the data sets in the collection 104, and Y represents the data set 106 of the unknown class. The data set 106 is classified in class $C_j$, where $d_{ss}(X_j, Y)$ is the minimum distance between point Y and any of the labeled points $X_i$ on the parameter space.

In an alternative implementation, the distance criterion includes a second condition. If the minimum distance between point Y and any of the labeled points $X_i$ on the parameter space is not below a defined subspace threshold distance $d_T$, then the data set represented by point Y is deemed not to be a member of any known class. Accordingly, the data set of point Y may be assigned to a previously un-attributed class, thereby incrementing the class count P by one.

Turning again to FIG. 2, the distances $d_{AY}$ and $d_{BY}$ are shown with respect to their respective end points. The distance $d_{BY}$ is determined to be the minimum distance among all illumination subspaces mapped to the parameter space 200. In one implementation, the classifier may deem the points B and Y to satisfy the distance criterion (e.g., to represent the minimum distance) and therefore classify the data set mapped to point Y as being in the same class as the data set mapped to B.

In an alternative implementation, the distance criterion also requires that the points B and Y satisfy a threshold condition. For example, if the distance $d_{BY}$ is the minimum distance between point Y and all other points and the distance $d_{BY}$ does not exceed the subspace threshold distance $d_T$ (represented by the dashed circle), then the classifier may classify the data set mapped to Y as being in the same class as the data set mapped to B. However, if the distance $d_{BY}$ is the minimum distance between point Y and all other points but the distance $d_{BY}$ exceeds the subspace threshold distance $d_T$, then the classifier identifies the data set mapped to Y as not being a member of any known class. In this circumstance, the classifier may provide a mechanism for defining a new class (e.g., a user prompt, an automated class initiator, etc.).

Figure 3:
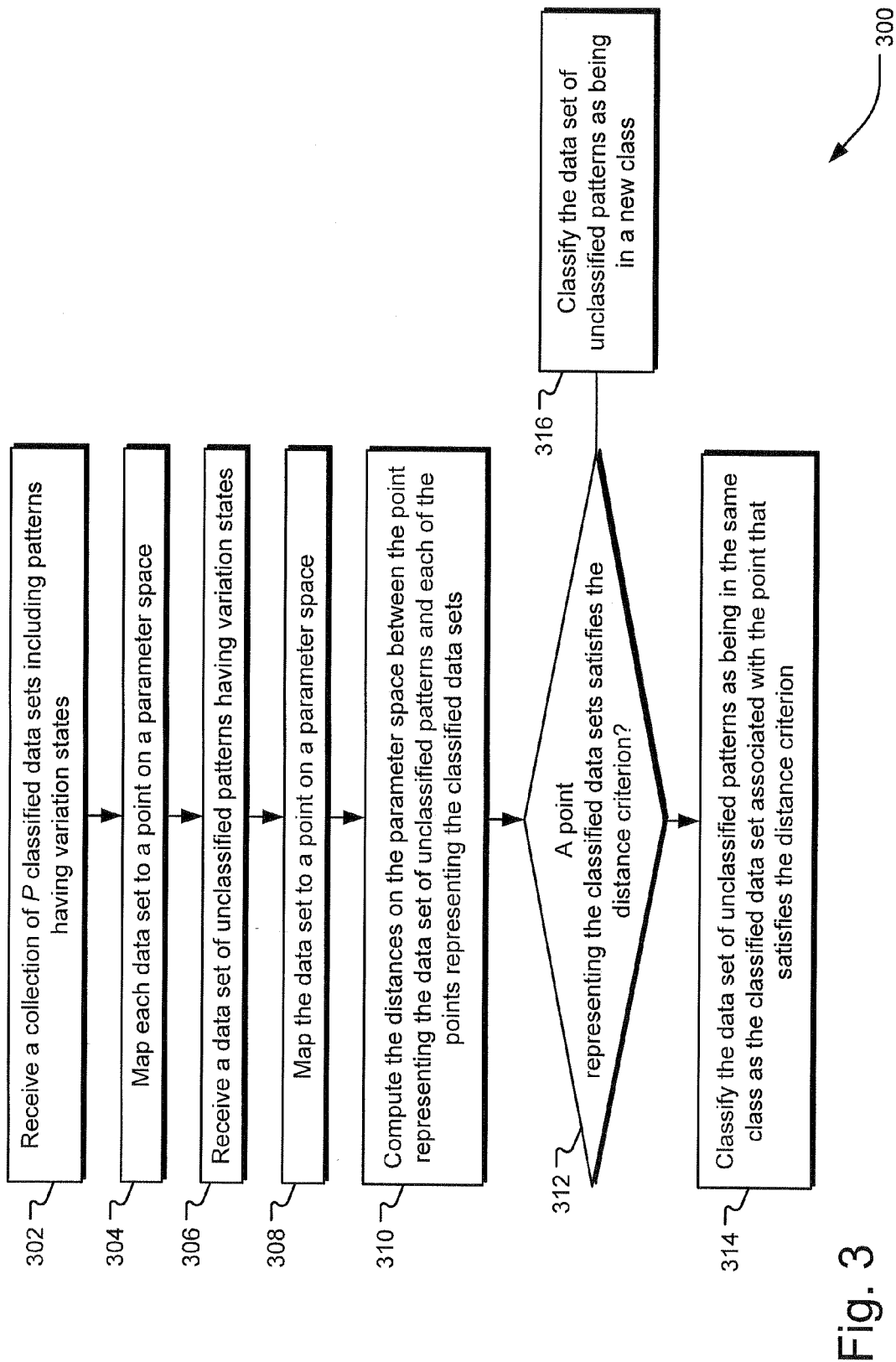
FIG. 3 illustrates example operations for performing set-to-set pattern recognition.

FIG. 3 illustrates example operations 300 for performing set-to-set pattern recognition on a parameter space. A receiving operation 302 receives a collection of labeled data sets of patterns. Each pattern has a variation of state that distinguishes it from other patterns in the data set. For example, if the patterns are facial images, the variation of state may be characterized without limitation by variations in illumination, pose, haircut, color, and/or accessories (e.g., eyeglasses, earrings, etc.) and/or combinations thereof. In one implementation, the receiving operation 302 retrieves the collection of labeled data sets from one or more storage media, which may be locally or remotely coupled to one or more computing systems executing the receiving operation 302.

A mapping operation 304 maps each labeled data set to a point on a parameter space (e.g., the Grassmannian, a Stiefel manifold, a flag manifold, a product of manifolds, etc.). In one implementation, the patterns of each data set are normalized, vectorized, and/or reduced (e.g., using SVD) to generate a subspace representation of q dimensions for each data set.

Another receiving operation 306 receives unlabeled data sets of patterns. Each pattern also has a variation of state that distinguishes it from other patterns in the data set. Another mapping operation 308 maps the data set to a point in the same parameter space. In one implementation, the patterns of each data set are normalized, vectorized, and/or reduced (e.g., using SVD) to generate a subspace representation of q dimensions for the data set.

A distance operation 310 computes the distances within the parameter space between the point associated with the unlabeled data set and the points associated with the labeled data sets. Several examples of distances are described herein, although it should be understood that other distance computations may be employed.

A decision operation 312 determines whether any of the computed distances satisfies a distance criterion. In one implementation, the distance criterion seeks the minimum distance computed in the distance operation 310. In another implementation, the distance criterion also requires that the minimum distance not exceed a distance threshold. If a computed distance satisfies the distance criterion, then a classifying operation 314 assigns the unlabeled data set to the same class as the labeled data set with which it satisfied the distance criterion (e.g., by attributing the label of the labeled data set to the unlabeled data set). If no computed distance satisfies the distance criterion, then a classifying operation 316 classifies the unlabeled data set into a new class (e.g., by attributing a new label to the data set).

Mapping sets of patterns to points on a parameter space allows for generalization. A set of patterns may be mapped to a set of nested subspaces and therefore be viewed as a point made up of the combination of these points. Given the set of nested subspaces $$V_1 \subset V_2 \subset \ldots \subset V_N,$$

a set of patterns maps to $p^{(1)} \in V_1$, and $p^{(i)} \in V_i$ generates a new point $$p=(p^{(1)}, p^{(2)}, \ldots, p^{(N)}),$$

which is a point on a new parameter space, i.e., a flag manifold. This new parameter space parameterizes nested sequences of vector spaces within dimension constraints. In particular, if $V_1 \subset V_2 \subset \ldots \subset V_k$ inside a fixed $R^n$, where the dimension $v_i$ is equal to $n_i$, then Grassmannians are special cases of the flag manifolds because $$Fl(k;n)=Gr(k,r).$$

The additional structure of the flag variety allows for an even larger family of metrics. For example, there is a surjective map from $Fl(n_1, \ldots, n_k; n)$ to $Gr(n_i, n)$ for each i, and the family of metrics used on each Grassmann manifold can be combined to form an even larger family. This larger family will permit the identification of specific subspaces that have particularly useful discriminatory information.

Figure 4:
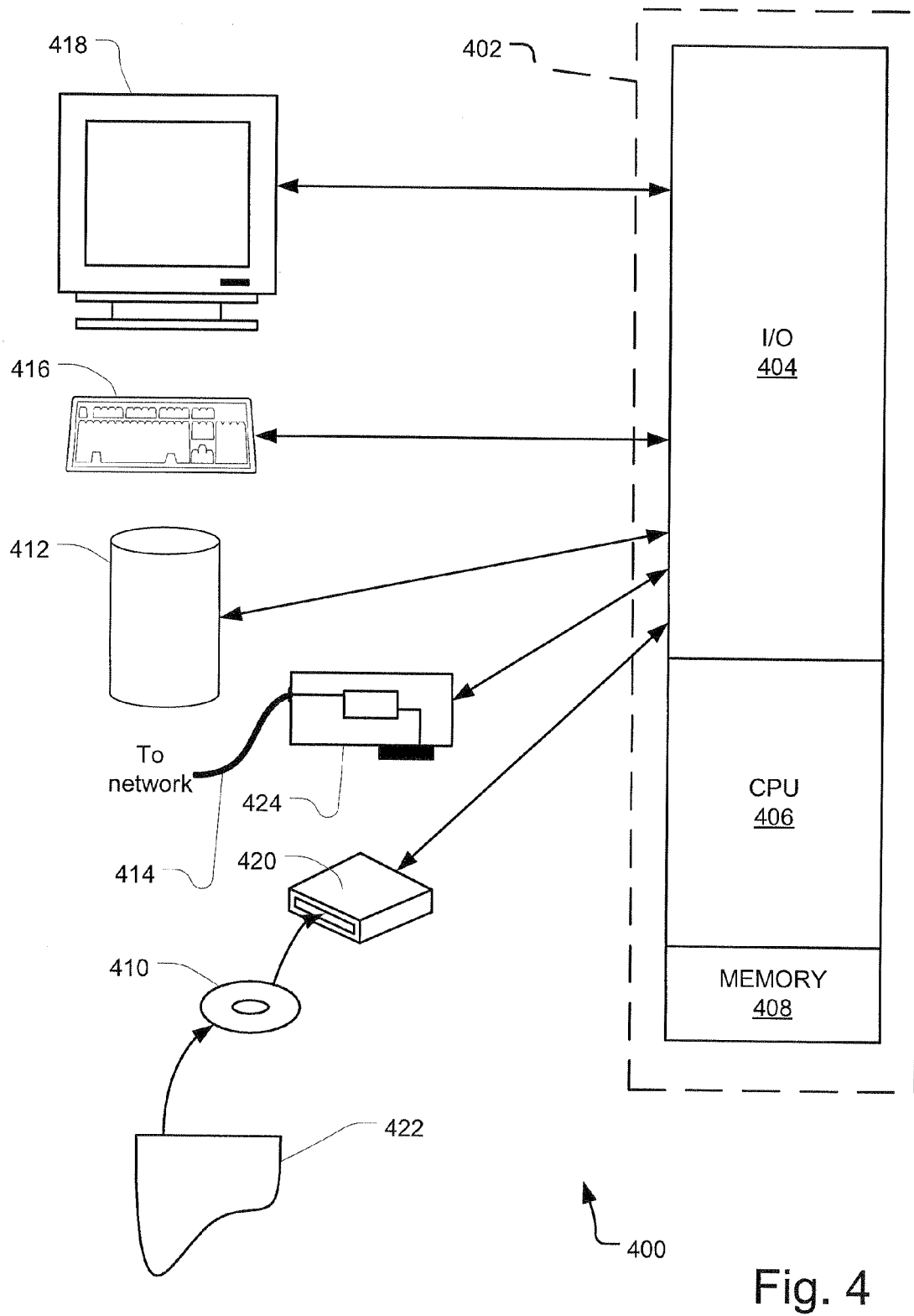
FIG. 4 illustrates components of an example system that can be useful in the implementation of the described technology.

FIG. 4 illustrates components of an example system that can be useful in the implementation of the described technology. A general purpose computer system 400 is capable of executing a computer program product to execute a computer process. Data and program files may be input to the computer system 400, which reads the files and executes the programs therein. Some of the elements of a general purpose computer system 400 are shown in FIG. 4 wherein a processor 402 is shown having an input/output (I/O) section 404, a Central Processing Unit (CPU) 406, and a memory section 408. There may be one or more processors 402, such that the processor 402 of the computer system 400 comprises a single central-processing unit 406, or a plurality of processing units, commonly referred to as a parallel processing environment. The computer system 400 may be a conventional computer, a distributed computer, or any other type of computer. The described technology is optionally implemented in software devices loaded in memory 408, stored on a configured DVD/CD-ROM 410 or storage unit 412, and/or communicated via a wired or wireless network link 414 on a carrier signal, thereby transforming the computer system 400 in FIG. 4 to a special purpose machine for implementing the described operations.

The I/O section 404 is connected to one or more user-interface devices (e.g., a keyboard 416 and a display unit 418), a disk storage unit 412, and a disk drive unit 420. Generally, in contemporary systems, the disk drive unit 420 is a DVD/CD-ROM drive unit capable of reading the DVD/CD-ROM medium 410, which typically contains programs and data 422. Computer program products containing mechanisms to effectuate the systems and methods in accordance with the described technology may reside in the memory section 404, on a disk storage unit 412, or on the DVD/CD-ROM medium 410 of such a system 400. Alternatively, a disk drive unit 420 may be replaced or supplemented by a floppy drive unit, a tape drive unit, or other storage medium drive unit. The network adapter 424 is capable of connecting the computer system to a network via the network link 414, through which the computer system can receive instructions and data embodied in a carrier wave. Examples of such systems include but are not limited to personal computers offered manufacturers of Intel-compatible computing systems, PowerPC-based computing systems, ARM-based computing systems, and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 400 is connected (by wired connection or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are exemplary and other means of and communications devices for establishing a communications link between the computers may be used.

In an example implementation, a pre-processor, a classifier module, and other modules may be embodied by instructions stored in memory 408 and/or storage devices 412 or storage media 410 and processed by the processing unit 406. Labeled data sets, unlabeled data sets, vectorized data, mapped data, and other data may be stored in memory 408 and/or storage devices 412 or storage media 410 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method comprising:
mapping, using a processor, each data set of a collection of data sets of labeled patterns to a point on a parameter space, the parameter space being one of a Grassman manifold, a Stiefel manifold, a Flag manifold, and a product of manifolds, each labeled pattern having a variation of state distinguishing the labeled pattern from other labeled patterns in the data set;
mapping a data set of unlabeled patterns to a point on the parameter space, each unlabeled pattern having a variation of state distinguishing the unlabeled pattern from other unlabeled patterns in the data set;
if a distance, computed on the parameter space, between the point mapped from the data set of unlabeled patterns and one of the points mapped from the data set of labeled patterns satisfies a distance criterion evaluated on the parameter space, attributing the label of the data set of the labeled pattern mapped to the point satisfying the distance criterion to the data set of unlabeled patterns.

2. The method of claim 1 wherein the distance criterion includes weighting parameters that are determined a priori.

3. The method of claim 1 wherein the distance criterion includes weighting parameters that are adapted over multiple iterations.

4. The method of claim 1 wherein at least one point mapped to the parameter space is identified as a subspace of an ordered set of orthonormal vectors.

5. The method of claim 1 wherein at least one point mapped to the parameter space is identified as a subspace of a fixed vector space.

6. The method of claim 1 wherein at least one point mapped to the parameter space is identified as a nested sequence of subspaces of fixed dimensions.

7. The method of claim 1 wherein each pattern represents a region of connected data points in a corresponding base pattern.

8. The method of claim 1 wherein each pattern represents a plurality of projections to fiducial data points within a corresponding base pattern.

9. The method of claim 1 wherein each pattern represents a plurality of arbitrary data points selected from a corresponding base pattern.

10. The method of claim 1 wherein the distance criterion includes a condition seeking a minimum distance between two points on the parameter space.

11. The method of claim 10 wherein the distance criterion further includes a condition that the minimum distance between the two points not exceed a distance threshold.

12. One or more computer readable storage media storing computer executable instructions for executing a computer process classifying a data set of related unlabeled patterns on a computing system, the computer process comprising:
mapping each data set of a collection of data sets to a point on a parameter space, the parameter space being one of a Grassman manifold, a Stiefel manifold, a Flag manifold, and a product of manifolds, each data set of the collection containing labeled patterns, each labeled pattern having a variation of state distinguishing the labeled pattern from other labeled patterns in the data set;

mapping the data set of unlabeled patterns to a point on the parameter space, each unlabeled pattern having a variation of state distinguishing the unlabeled pattern from other unlabeled patterns in the data set;

if a distance computed on the parameter space between the point mapped from the data set of unlabeled patterns and one of the points mapped from the data set of labeled patterns satisfies a distance criterion evaluated on the parameter space, attributing the label of the data set of the labeled pattern mapped to the point satisfying the distance criterion to the data set of unlabeled patterns.

13. The one or more computer-readable media of claim 12 wherein at least one point mapped to the parameter space is identified as a subspace of a set of ordered orthonormal vectors.

14. The one or more computer-readable media of claim 12 wherein at least one point mapped to the parameter space is identified as a subspace of a fixed vector space.

15. The one or more computer-readable media of claim 12 wherein at least one point mapped to the parameter space is identified as a nested sequence of subspaces of fixed dimensions.

16. The one or more computer-readable media of claim 12 wherein the distance criterion includes a condition seeking a minimum distance between two points on the parameter space.

17. The one or more computer-readable media of claim 16 wherein the distance criterion further includes a condition that the minimum distance between the two points not exceed a distance threshold.

18. A method comprising:

receiving a collection of data sets of labeled images, each labeled image of a data set having a variation of illumination distinguishing the labeled image from other labeled images in the data set;

mapping, using a processor, each data set of the collection of data sets to a point on a Grassmann manifold;

mapping a data set of unlabeled images to a point on the Grassmann manifold, each unlabeled image having a variation of illumination distinguishing the unlabeled image from other unlabeled images in the data set;

computing, on the Grassmann manifold, a similarity measure between the point mapped from the data set of unlabeled images and each point mapped from the data sets of labeled images;

if a similarity measure computed on the Grassmann manifold between the point mapped from the data set of unlabeled images and one of the points mapped from the data set of labeled images satisfies a similarity criterion evaluated on the Grassmann manifold, attributing the label of the data set of the labeled pattern mapped to the point satisfying the similarity criterion to the data set of unlabeled images.

19. The method of claim 18 wherein the similarity criterion includes a condition seeking a minimum distance between two points on the parameter space.

20. The method of claim 19 wherein the similarity criterion further includes a condition that the minimum distance between the two points not exceed a distance threshold.

* * * * *